(No Model.)
A. BRYSON, Jr., & H. S. MUDGE.
AUTOMATIC SWITCH FOR PNEUMATIC DISPATCH.
No. 353,400. Patented Nov. 30, 1886.
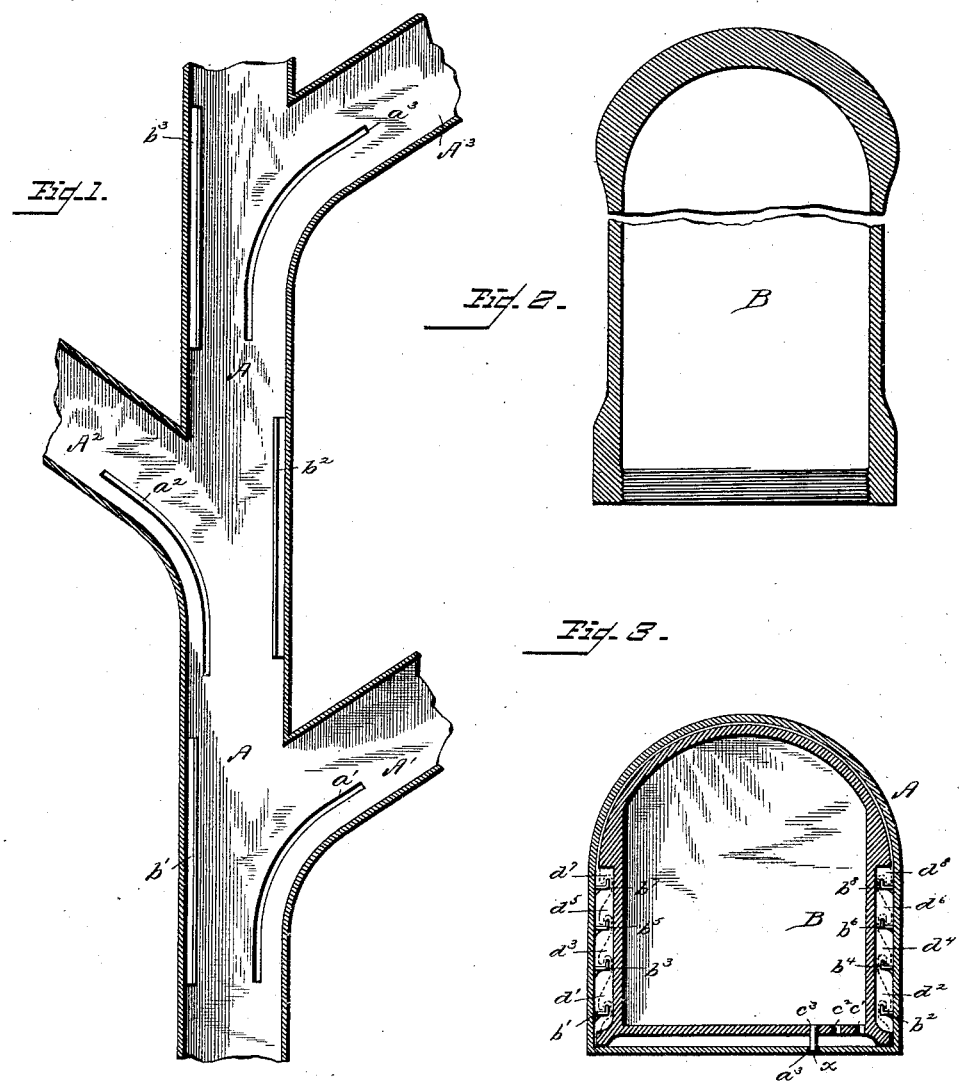
Witnesses
Inventor
A. Bryson Jr.
Henry S. Mudge.
By their Attorney
Woodbury Lowery

UNITED STATES PATENT OFFICE.

ANDREW BRYSON, JR., AND HENRY S. MUDGE, OF BROOKLYN, NEW YORK.

AUTOMATIC SWITCH FOR PNEUMATIC DISPATCH.

SPECIFICATION forming part of Letters Patent No. 353,400, dated November 30, 1886.

Application filed July 27, 1886. Serial No. 209,262. (No model.)

*To all whom it may concern:*

Be it known that we, ANDREW BRYSON, Jr., and HENRY S. MUDGE, citizens of the United States, residing at Brooklyn, in the county of Kings, State of New York, have invented certain new and useful Improvements in Automatic Switches for Pneumatic Dispatch, of which the following is a specification, reference being had therein to the accompanying drawings.

Figure 1 is a plan view showing a pneumatic tube with the switches branching therefrom. Fig. 2 is a cross-section of the pneumatic carrier, showing the enlarged and projecting bearings at the front and rear, and Fig. 3 is a cross-section of the pneumatic tube and carrier in position.

Our invention consists of pneumatic switch mechanism in which grooves or guides in the bottom of the pneumatic tube conduct around the curve into the lateral branches at their intersection with the main tube. These grooves or guides correspond in number with that of the branch tubes, and are so located with regard to each other across the bottom of the tube that no two grooves or guides coincide with the same longitudinal axis of the tube. On the bottom of a carrier fitting the tube is a director, which may be so adjusted by the sender that it will engage automatically with any predetermined groove or guide, and thus conducts the carrier into that branch tube for which the director has been adjusted. In practice two directors may be used, one at each end of the carrier. At the intersection of the branch and main tubes lateral guides are provided on the main tube and opposite such intersection, with which hooks on the carrier interlock. These serve to conduct the carrier past the lateral openings, and thus prevent any possible deviation at the switch, which might bring the carrier against the angle at the bifurcation of the tube, and which is especially liable to occur where there is a curve in the tube in the opposite direction to that of the switches. These guides have a relative position with respect to each other similar to that of the switch-grooves, and the hooks on the carrier being also adjustable it is apparent that on removing the hook that engages with the lateral guide opposite that branch of the tube it is desired the carrier should enter it will be free to follow the direction given it by its director, which has previously been adjusted to engage with that particular groove. In order to secure the interlocking of these several devices, the pneumatic tube is shown in the drawings to be of such shape that the carrier fitting therein retains constantly the same position with respect to the tube and is rendered incapable of transverse movement; but we do not limit ourselves to the particular form of tube there shown, as it is obvious that any arrangement, even of a rectangular or cylindrical tube, such as will prevent the rotation of the carrier fitting therein, and thus secure the interlocking of the different parts, will answer our purpose.

In the accompanying drawings, A is the main tube. $A'$ $A^2$ $A^3$ are the branch tubes, and $a'$ $a^2$ $a^3$ the switch guides or grooves located across the bottom of the main tube in such wise that the entrance of no two guides or grooves coincide with the same longitudinal axis.

$b'$ $b^2$ $b^3$ are lateral guides, placed on the sides of tube A opposite the entrance of the branch tubes $A'$ $A^2$ $A^3$, and which engage with the adjustable hooks $d'$ $d^2$ $d^3$ on the carrier B. The lateral guides for interlocking with the adjustable hooks on the carrier may also be used to direct the carrier into any switch or side branch, thus serving the purpose of the grooves and directors. Carrier B has its sides hollowed out, as shown in Fig. 3, to allow it to pass the guides and to prevent binding at curves. The bottom is also hollowed out in order to give free play to the director $x$.

$c'$ $c^2$ $c^3$ are apertures in the bottom of carrier B, corresponding to the entrance of grooves $a'$ $a^2$ $a^3$ in such wise that when director $x$ is placed in any one of these apertures—say $c^3$—it will in its passage through tube A encounter the opening of but one groove, $a^3$, with which it will engage. Where two directors are used, there are two sets of apertures, one at each end of the carrier, similar in all respects to those already described. Where but one director is used, the apertures are on the front end of the carrier.

In Fig. 3 director $x$ is shown as operated by gravity, but any means may be used such as will cause it to engage with the particular switch for which it is set.

The method of operating is as follows: Assume that it is intended to direct carrier B into lateral branch $A^3$ of Fig. 1. The sender proceeds to place the directors $x$ at each end of carrier B in apertures $c^3$, and at the same time he removes hook $d^3$ on the carrier, and then starts it upon its course. Passing branch $A'$, directors $x$ encounter no groove, while at the same time hook $d'$ interlocks with lateral guide $b'$ and steadies the carrier in its transit. $A^2$ is passed in the same way, except that in this instance it is $b^2$ and $d^2$ which interlock. On reaching $a^3$, however, directors $x$, passing vertically over the groove, engage with it successively, and hook $d^3$, having been removed from the carrier, it is free to follow the direction given it by the groove and directors.

While we show our switch mechanism as applied to a pneumatic tube, we do not limit ourselves to its use in that relation alone, as it can be readily used on any way, channel, duct, or conduit where it is desired to control the direction of the carriage from the sending-station without complicated electric or other appliances, and whether or not the carriage supplies its own motive power. Neither do we limit ourselves to the particular shape of the switch grooves or guides and the director, of which the essential features are that they shall so conform to each other that when they engage they shall suffice to hold the carrier to the particular direction selected, those of the director that it be automatic and adjustable. Neither do we limit ourselves to the location of the conducting-switches on the bottom of a pneumatic or other tube, since they may as readily be placed at the top, side, or bottom, or at both top and bottom, one or all, thus greatly increasing the number of switches that may be used. It is also obvious that by varying the size of the switch-groove two switch-grooves may be placed upon the same longitudinal axis, so that a director adjusted to engage with the larger of the two will ride over the smaller without interference.

Having thus described our invention, what we claim as new, and desire to secure by Letters Patent, is—

1. The combination of a series of guides, a carrier, and means on the carrier to engage automatically with any predetermined guide of the series.

2. The combination of a series of guides, a carrier, and means on the carrier adjustable at the option of the sender to engage automatically with any predetermined guide of the series.

3. The combination of a pneumatic tube, a carrier, and an automatic-switch consisting of fixed guides in the tube, and means on the carrier adjustable vertically and transversely to engage with any predetermined guide.

4. The combination of a pneumatic tube, a carrier fitting therein, automatic-switch mechanism, and mechanism for controlling the carrier when passing an intersecting branch, substantially as described.

5. In a pneumatic-dispatch tube, mechanism for controlling the carrier when passing an intersecting branch, consisting of lateral guides located at such intersection and parallel with the main tube, and means on the carrier adjustable at the will of the sender to engage automatically with one or more of such lateral guides.

6. The combination of groove $a'$, carrier B, aperture $c'$, and director $x$, substantially as and for the purpose hereinbefore set forth.

7. The combination of grooves $a'\ a^2\ a^3$, carrier B, apertures $c'\ c^2\ c^3$, and adjustable director $x$, substantially as and for the purpose hereinbefore set forth.

8. The combination of tube A, carrier B, grooves $a'\ a^2\ a^3$, apertures $c'\ c^2\ c^3$, and adjustable director $x$, substantially as and for the purpose hereinbefore set forth.

9. The combination of tube A, lateral guides $b'\ b^2\ b^3$, carrier B, and adjustable removable hooks $d'\ d^2\ d^3$, substantially as and for the purpose hereinbefore set forth.

10. The combination of tube A, carrier B, grooves $a'\ a^2\ a^3$, apertures $c'\ c^2\ c^3$, and adjustable director $x$, with lateral guides $b'\ b^2\ b^3$ and adjustable removable hooks $d'\ d^2\ d^3$, substantially as and for the purpose hereinbefore set forth.

11. Pneumatic carrier B, adapted to fit the tube at both ends and having its sides and bottom hollowed out, substantially as and for the purpose hereinbefore set forth.

In testimony whereof we affix our signatures in presence of two witnesses.

ANDREW BRYSON, JR.
HENRY S. MUDGE.

Witnesses:
GEORGE RICE,
RICHARD B. CLAYTON.